(12) United States Patent
Noonan

(10) Patent No.: US 10,708,782 B1
(45) Date of Patent: Jul. 7, 2020

(54) WIRELESS COMMUNICATION MANAGED ACCESS SYSTEM

(71) Applicant: Joseph S. Noonan, Scituate, MA (US)

(72) Inventor: Joseph S. Noonan, Scituate, MA (US)

( * ) Notice: Subject to any disclaimer, the term of this patent is extended or adjusted under 35 U.S.C. 154(b) by 0 days.

(21) Appl. No.: 16/241,776

(22) Filed: Jan. 7, 2019

Related U.S. Application Data

(60) Provisional application No. 62/614,242, filed on Jan. 5, 2018.

(51) Int. Cl.
| | |
|---|---|
| *H04L 29/06* | (2006.01) |
| *H04W 12/06* | (2009.01) |
| *H04W 48/04* | (2009.01) |
| *H04W 12/00* | (2009.01) |
| *H04W 16/18* | (2009.01) |
| *H04W 48/08* | (2009.01) |

(52) U.S. Cl.
CPC ..... *H04W 12/06* (2013.01); *H04W 12/00503* (2019.01); *H04W 16/18* (2013.01); *H04W 48/04* (2013.01); *H04W 48/08* (2013.01)

(58) Field of Classification Search
CPC .......... H04W 12/06; H04W 12/00503; H04W 16/18; H04W 48/04; H04W 48/08
See application file for complete search history.

(56) References Cited

U.S. PATENT DOCUMENTS

| | | | | |
|---|---|---|---|---|
| 6,674,860 B1* | 1/2004 | Pirila | ................... | G01S 5/0045 380/247 |
| 6,907,254 B1* | 6/2005 | Westfield | .............. | H04W 48/04 455/404.2 |
| 7,046,990 B2* | 5/2006 | Grego | ................... | H04W 12/08 455/410 |
| 9,554,282 B2* | 1/2017 | Steer | ...................... | H04W 4/021 |
| 9,626,874 B1* | 4/2017 | Gupta | .................. | G08G 5/0069 |
| 2003/0008644 A1* | 1/2003 | Akhterzzaman | ........ | H04M 3/02 455/418 |
| 2003/0060201 A1* | 3/2003 | Soliman | ................ | H04W 36/32 455/442 |
| 2006/0038677 A1* | 2/2006 | Diener | ............... | G01R 29/0871 340/540 |
| 2008/0008143 A1* | 1/2008 | Robertson | ........... | H04L 63/0428 370/338 |
| 2008/0025238 A1* | 1/2008 | McCown | .................. | G01S 5/04 370/308 |
| 2008/0057976 A1* | 3/2008 | Rae | ...................... | H04W 64/003 455/456.1 |
| 2011/0077022 A1* | 3/2011 | Scovill | .................... | H04L 41/12 455/456.1 |
| 2011/0165861 A1* | 7/2011 | Wilson | ..................... | H04K 3/65 455/411 |
| 2012/0190386 A1* | 7/2012 | Anderson | .............. | G01C 15/04 455/456.3 |

(Continued)

*Primary Examiner* — Ghodrat Jamshidi

(74) *Attorney, Agent, or Firm* — Law Office of Carl Giordano, PC

(57) ABSTRACT

Disclosed is a Managed Access System that operates as a man-in-the-middle between a handset and a network carrier system (e.g., Verizon, AT&T) to control access of handsets to connect to the network carrier system. The Managed Access System includes adaptable hardware, which emulates or simulates the characteristics of the handset such that the network carrier system communicates with the Managed Access System rather than the handset.

30 Claims, 5 Drawing Sheets

(56) References Cited

U.S. PATENT DOCUMENTS

| | | | |
|---|---|---|---|
| 2015/0079945 A1* | 3/2015 | Rubin | H04W 12/08 455/411 |
| 2015/0244876 A1* | 8/2015 | Jabara | H04W 12/06 455/406 |
| 2015/0333528 A1* | 11/2015 | Leabman | H04B 5/0037 307/104 |
| 2017/0179771 A1* | 6/2017 | Leabman | H02J 50/60 |

* cited by examiner

WIRELESS COMMUNICATION MANAGED ACCESS SYSTEM

CLAIM OF PRIORITY

This application claims, pursuant to 35 USA 119, priority to, and the benefit of, the earlier filing date of, that patent application filed on Jan. 5, 2018 and afforded Ser. No. 62/612,242, as is expressed in the originally filed Aplication Data Sheet, the contents of which are incorporated by refernece, herein.

FIELD OF THE INVENTION

This application relates to the field of wireless communication and, particularly, to the management of wireless communication devices.

BACKGROUND OF THE INVENTION

Wireless communications have revolutionized the manner in which people communicate today. Cellular communications towers have become a ubiquitous feature of the landscape such that one person can communicate, via voice or data, to almost any other person on the Earth.

However, there are locations, such as prisons, secure complexes, embassies, military bases, etc. and situations, such as Homeland security, hostage negotiations, law enforcement communication, and public safety messaging, in which controlling a wireless communication device (i.e., a cell phone, a PDA, a digital handset, a user equipment (UE)) from receiving signals from and/or transmitting signals to another person is necessary and required.

Thus, there is a need in the industry for a system and method for controlling and managing wireless communications within an area in which wireless communication between persons is to be prevented

SUMMARY OF THE INVENTION

In accordance with one aspect of the invention a system for managing wireless communications is achieved by providing at least one intermediate management system between a wireless communication device (such as a cellular telephone or handset) and a central station (such as a cellular communication tower system of a telecommunication carrier (Telco) network or an access point in a Voice-over-IP (VOIP) network).

The objects and other aspects of the invention are further achieved using a first managed access system (MAS) that detects signals transmitted by a wireless communication device from an area or processes signals directed toward a wireless communication device in an area.

In accordance with principles of the invention, the first managed access system forces wireless communication devices within an area to connect to first management access system rather than to a Telco or to a VOIP network In accordance with the principles of the invention, the wireless communication device (hereinafter referred to as "3PH"—3th party handset) provides its identification and authentication information to the first MAS network (hereinafter referred to as MN1).

In accordance with the principles of the invention, the 3PH requests MN1 to authenticate communication between the 3PH and the MN1 on a specific protocol, wherein the MN1 maintains control of the 3PH and further provides an authentication request to a second MAS network (hereinafter referred to as MN2).

In accordance with the principles of the invention MN2 attaches to the 3PH provider (e.g., Telco) and provides the 3PH identification and authentication information to the 3PH provider.

In accordance with the principles of the invention the MN2 requests authentication information from the provider to communicate on a specific provider protocol to which the provider passes the 3PH authentication information to the MN2.

In accordance with the principles of the invention, the MN2 is registered with the provider (e.g., Telco) as the 3PH to which all incoming calls (text or data) received by the provider for the 3PH are directed to the MN2.

In accordance with the principles of the invention, the MN2, receiving incoming calls (text or data) provides analysis as to whether the incoming information may be provided to the 3PH or may be held and prevented from reaching the 3PH.

In accordance with the principles of the invention, a call (text or data) received by the MN1 from a 3PH in an area, designated as being a restrictive communication area (e.g., a prison), information regarding the 3PH is provided to the MN2, wherein the MN2 evaluates the characteristics of the 3PH and determines whether the 3PH is allowed to access the Telco or a communication network. If not the MN2 retains control of the 3PH to deny the 3PH from communicating with the Telco or the communication network. However, if the 3PH is indicated as being allowed to communicate with the Telco, the MN2 passes the communication from the 3PH to the Telco.

In accordance with the principles of the invention, MN2 retains control of the transmission of MN2 without the 3PH having knowledge of the man-in-the-middle MN2.

BRIEF DESCRIPTION OF THE DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. It would be further recognized that the accompanying drawings are not drawn to scale. In the accompanying drawings.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

BRIEF DESCRIPTION OF THE INVENTION

The 3G processing group has standardized the security requirements for communication over 3G (and subsequently 4G and 5G networks) in $3^{rd}$ *Generation Partnership Project; Technical Specification Group Services and System Aspects; 3GPP system Architecture Evolution (SAE): Security architecture (Release 9)* 3GPP TS 33.401, V9.8.0 (2015-09), wherein a user equipment (UE or 3PH) requires authentication for communication with an Evolved Packet Center (EPC). The security requirements ensure communications between two users are private and secure.

Figure 1:
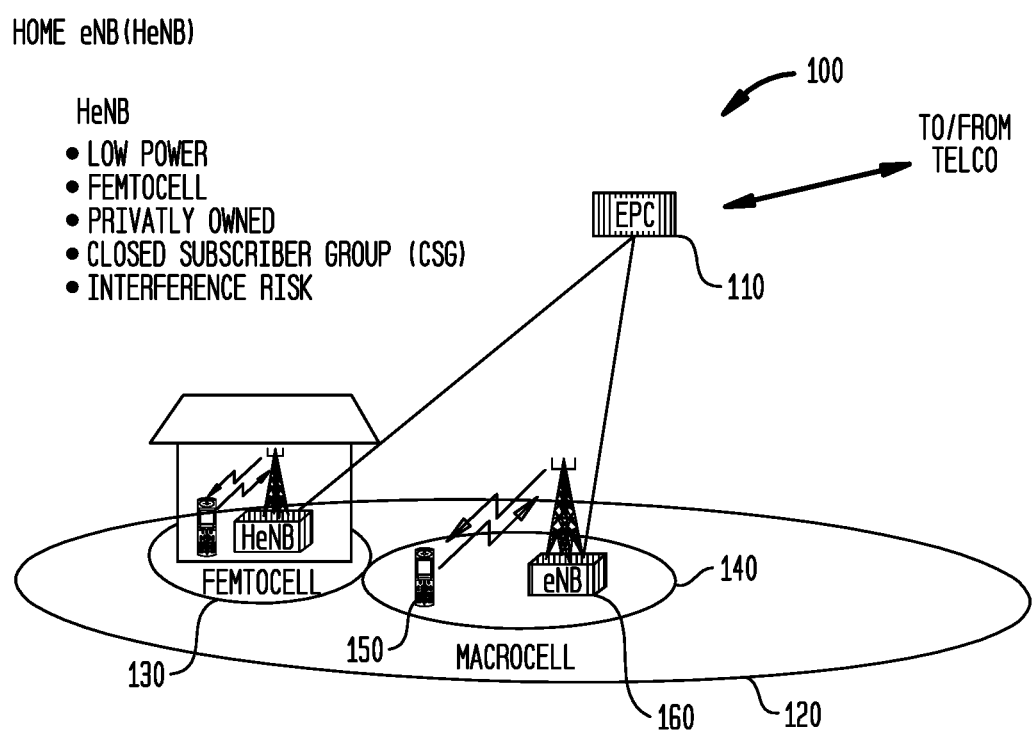
FIG. 1 illustrates an exemplary wireless communication network.

FIG. 1 illustrates an exemplary communication system 100 wherein an EPC (i.e., a packet center) 110 associated with a LTE (Long Term Evolution) communication network, provides Radio Frequency (RF) coverage to an area 120, referred to as a macrocell. The EPC communicates with a service provider such as Verizon, AT&T, etc., (i.e., a Telecommunication company, referred to herein after as a Telco) to provide communication between two handsets or other digital devices.

Within the macrocell 120 may be a plurality of smaller areas, referred to as microcells. In the illustrated example, a microcell 130 may be formed within a home, for example, using a wireless communication router; generally referred to in the industry as a router. A router allows communication devices to connect to a network using technology referred to as WI-FI.

Figure 2:
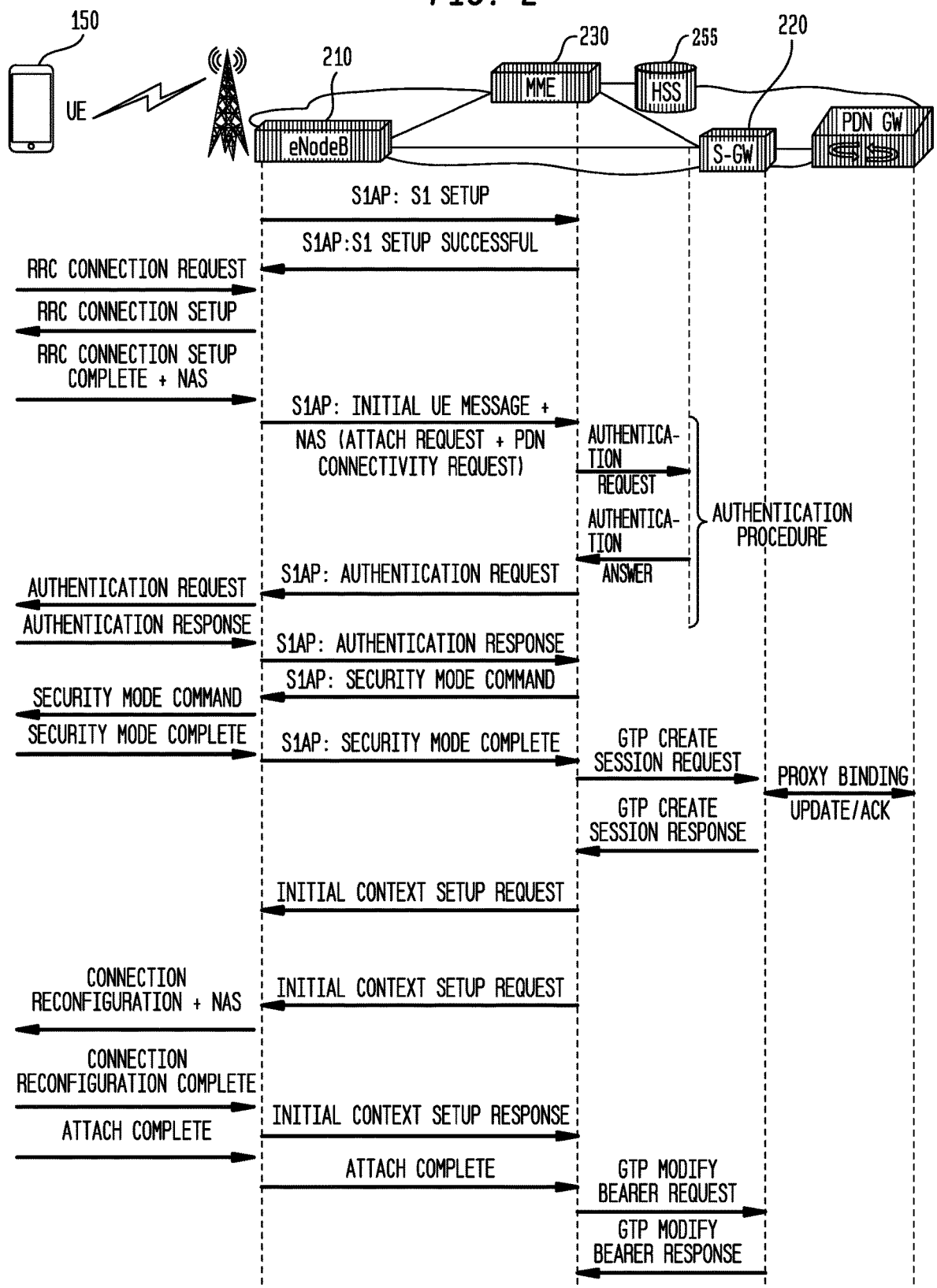
FIG. 2 illustrates a conventional communication sequence for a typical LTE (Long Term Evolution) communication for mobile devices and data terminals

Further illustrated is microcell 140, which represents a smaller area within macrocell 120. Microcell 140 may be managed by a EPC (Evolved Packet Core), which provides communication between a handset 150 and the Telco (not shown). In this illustrated example, the handset 150 communicates with a cell tower, which outputs a signal, the range of which defines the microcell 140. FIG. 2 illustrates a conventional communication handshake sequence in a conventional LTE communication system.

In this illustrated communication sequence to establish communication with a Telco, a handset 150 provides a request (RRC Connection Request) to node 210, which previously has been set up to communication with MME 230 and S-Gw (gateway) 220. MME 230 is connected to a data base 255, which includes communication protocol authentication codes. As is known in the art, wireless communication has progressed through multiple generations of improved performance. The generations are referred to as 2G, 3G, 4G and, recently, 5G. As is known in the art, 2G represents a second generation digital communication protocol, 3G represents a third generation digital communication protocol that provides greater capability over 2G protocols. For example, wide area wireless voice telephony, video calls and broadband wireless data capabilities are included in handsets utilizing 3G technology. 4G technology is an extension of 3G technology with more bandwidth and services offered than in 3G. The extended services include high quality audio video streaming over end to end Internet Protocol. 5G denotes the next major phase of mobile communication that ties together unrestricted call volumes and greater data broadcast services than offered in 4G.

Returning to FIG. 2, node 210 in detecting and receiving a signal from handset 150 communicates with MME 230 to obtain authentication codes to decode the detected signal. An authentication request is provided to handset 150, which provides an authentication response to the node 210. The node 210 provides a security mode command to the handset 150 to which the handset 150 provides a security mode complete message to the node 210. After receiving the security mode complete message, the node 210 communicates with the gateway 220, to connect to the Telco. The Telco acknowledges the request for a connection and provides a Session response message, which is provided to the handset 150 to complete the process of attaching the requesting handset 150 to the Telco for communicating with another party.

Figure 3:
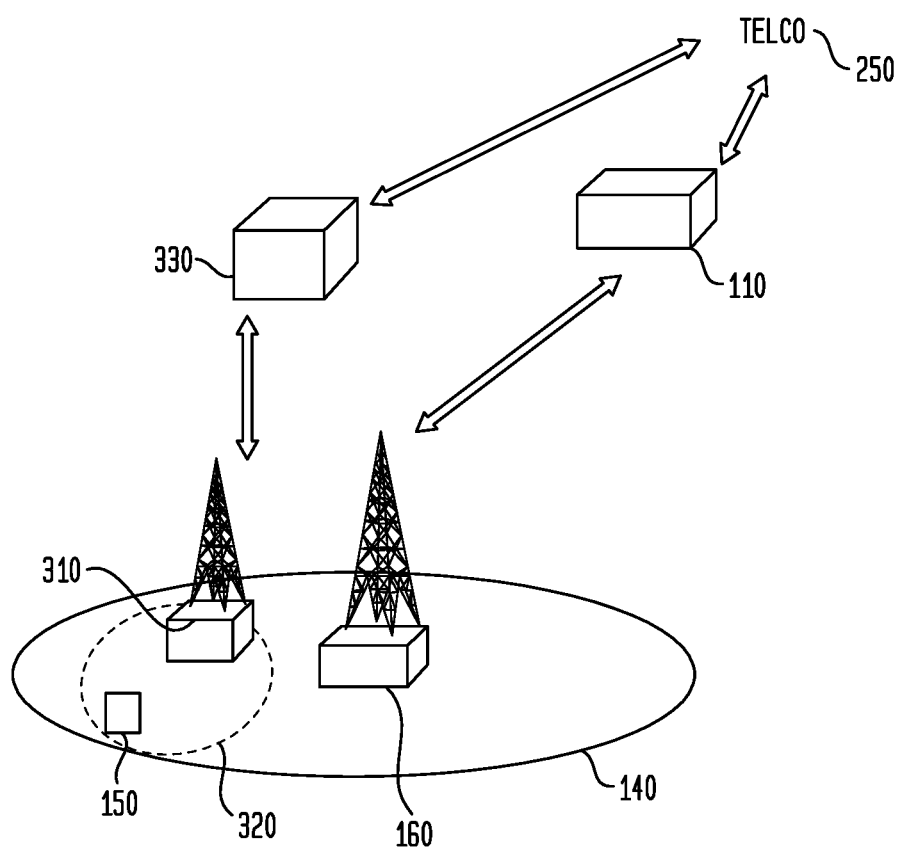
FIG. 3 illustrates a block diagram of a system configuration in accordance with the principles of the invention.

FIG. 3 illustrates a system configuration in accordance with the principles of the invention.

In accordance with the principles of the invention, a first managed access system (FMAS) 310 establishes a microcell 320 within microcell 140 by generating a signal power, which within the microcell 320 is greater than a signal power of the node 210. In this way handset 150, which attaches to the highest power signal, attaches to FMAS 310 in order to attempt communication with Telco 250 (as previously discussed).

In one embodiment of the invention the FMAS system 310, which is composed of equipments, such as antennas, receivers/transmitters (i.e., transceiver), decoders, filters, amplifiers, and processors, reads the message being sent by the handset 150 and takes that message and transmits the received message to a second MAS (SMAS) 330, which also is composed of equipments such as antennas, transceivers, decoders, filters amplifiers and processors. SMAS 330 then transmits the message to the Telco 250.

When the Telco 250 responds to the message sent by the SMAS 330, the SMAS 330 reads the response message being sent by the Telco Carrier Network Radio 250, and transmits the response message to FMAS 310. FMAS 310 transmits the message to handset 150. This process of re-transmitting the handset 150 messages and re-transmitting the handset 150 messages continues throughout the desired communication request.

In one embodiment of the invention where the objective is to control LTE (Long Term Evolution) handsets, and the FMAS 310 does not have the authentication keys, which are held by the handset 150 and the TELCO 250, the FMAS 310 will attract the handset 150, as previously discussed. Handset 150 will provide its identification and authentication information to FMAS 310 as part of the authentication process.

FMAS 310 maintains control of the handset 150 while this process is being completed. Accordingly, FMAS 310 sends the information being provided by handset 150 to SMAS 330, as previously discussed. Preferably SMAS 330 is inside the coverage area (120, FIG. 1) of the Telco. SMAS 330, which is further composed of a software defined radio user equipment (SDR-UE), communicates with the Telco, so as to attach to Telco 250, utilizing the identification and authentication information of the handset 150. The SDR-UE of SMAS 330 operates as, emulates, or simulates the characteristics of handset 150, such that the Telco 250 believes that SMAS 330 is the handset 150. SMAS 330, thus, operating as the handset 150, requests authentication to connect to the Telco 250, using the identification and authentication information of handset 150.

The handshake and authentication process between the handset 150 (or SMAS_330) and the Telco 250 is defined in the LTE 3GPP standard, previously discussed. Each time the handset 150 provides a transmission (which includes one or more of handset information, data, a request, a response) to FMAS 310, FMAS 310 relays that transmission (i.e., information, data, a request, a response to SMAS 330. Similarly, each time the Telco 250 provides a transmission (i.e., information, data, a request, a response to handset 150, the Telco 250 provides the transmission to SMAS 330, which relays that transmission to FMAS 310.

In accordance with the principles of the invention, the equipments of FMAS 310 may include a transceiver (not shown) configured to communication on LTE protocols and channels, and a software defined radio (SDR) utilizing an LTE stack, an eNodeB, a femto cell, a transceiver system including a general purpose computer system, which when loaded with an application, converts the computer system into a specialized computer system or dedicated programmable hardware (e.g., ASIC, FPGA) to perform the processing disclosed herein. The communication protocols can be 2G, 3G, 4G, 5G and the like.

Figure 4:
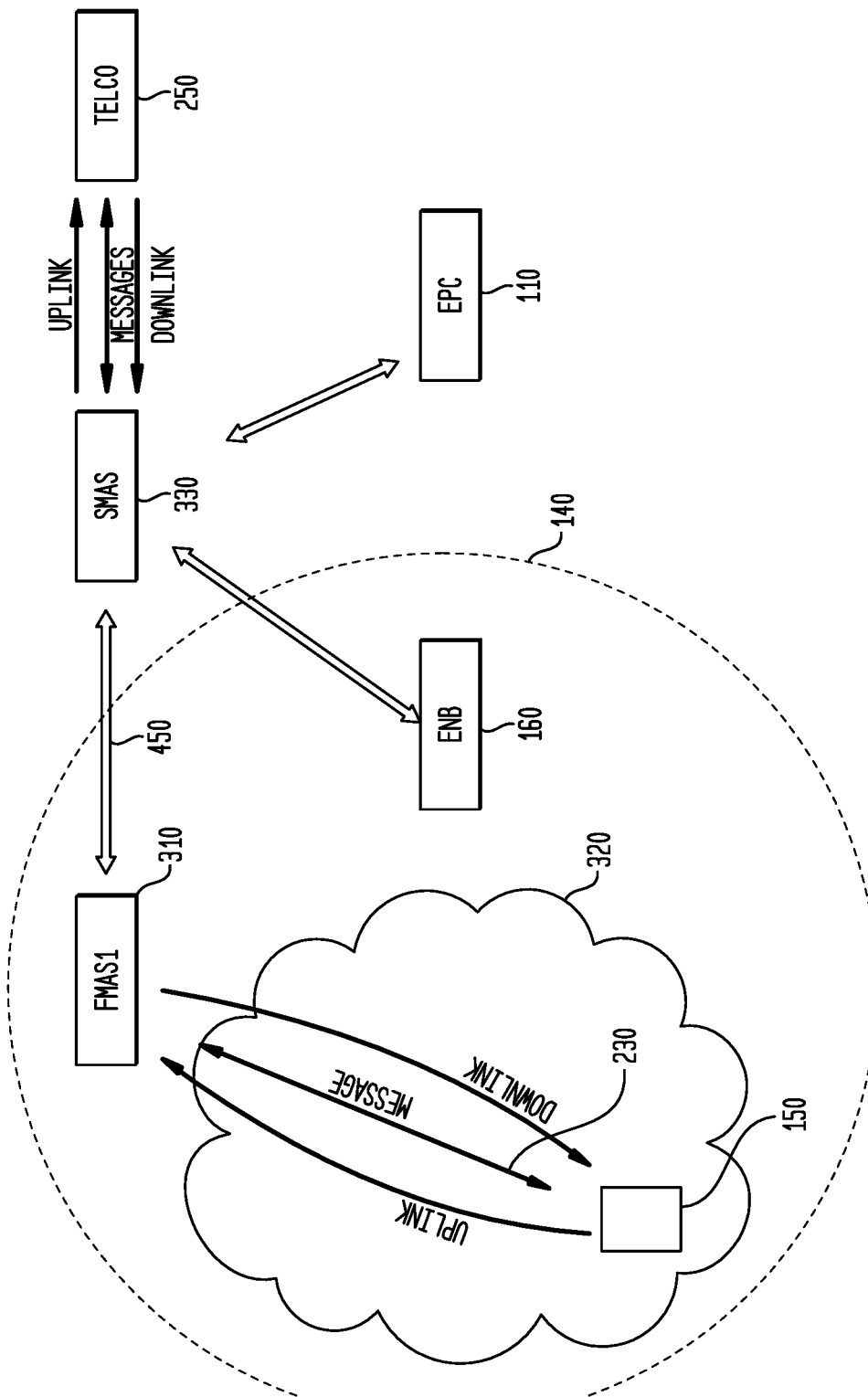
FIG. 4 illustrates a Managed Access System configuration in accordance with the principles of the invention.

FIG. 4 illustrates an exemplary system configuration in accordance with the principles of the invention. In this illustrated exemplary configuration, a FMAS 310 may establish an area 320 within a greater area 140, to control operation of handset 150.

In accordance with the principles of the invention, as previously discussed, the handset 150 communicates with FMAS 310 which communicates with SMAS 330 in order to communicate with Telco 250.

In accordance with the principles of the invention, the goal is to authenticate a handset so it can be communicated with and controlled by a local network controller 160 and not the Telco 250.

In this embodiment of the invention, handset 150 sends a RRC Connection request to a first transceiver (EnB, radio, wireless network) 160. The first transceiver sends the RRC Connection request to SMAS 330, which transmits the RRC Connection request to a Telco Carrier Network 250. The Telco Carrier Network 250 transmits a RRC Connection setup reply to SMAS 330, which transmits a RRC Connection setup reply to the first transceiver 160. The first transceiver 160 sends a RRC Connection setup reply to the handset 150.

The handset 150 sends a RRC Connection setup complete and the NAS to a first transceiver 160, which transmits the RRC Connection setup complete and the NAS to SMAS 330, which transmits the RRC Connection setup complete and the NAS to a Telco Carrier Network 250. Telco Carrier Network 250 sends an authentication request to SMAS 330, which transmits an authentication request to the first transceiver 160, which transmits the authentication request to the handset 150. The handset 150, in reply, sends an authentication response to first transceiver 160 which sends the authentication response to SMAS 330. SMAS 330 sends the authentication response to a Telco Carrier Network 250. Telco Carrier Network 250, then sends a Security Mode command to the SMAS 330, which sends the Security Mode command to the first transceiver 160 to be subsequently transmitted to the handset 150. In response handset 150 sends Security Mode complete to the first transceiver 160, which sends the Security Mode complete to the SMAS 330, which then transmits the. Security Mode complete message to the Telco Carrier Network 250 to complete the connection.

Thus, in accordance with the principles of the invention, SMAS 330, simulating or emulating the handset 150, directly communicates with Telco 250 rather than the handset 150.

In accordance with the principles of the invention, wherein the goal is to authenticate a handset 150 so it can be communicated with and controlled by a eNodeB 160 and EPC 110 and not the Telco 250, the handset 150 sends a RRC Connection request to a controlling eNodeB 160/EPC 110, which sends the RRC Connection request to a SMAS2 330, which includes a software defined user equipment (SDR-UE), as previously discussed. The SDR-UE, as previously discussed, sends the RRC Connection request to a Telco Carrier Network, 250, to which in response sends a RRC Connection setup reply to the SMAS 330, which sends a RRC Connection setup reply to the controlling node (eNB 160/EPC 110). The controlling node (eNB 160/EPC 110). sends a RRC Connection setup reply to the handset 150, which in response sends a RRC Connection setup complete and the NAS to controlling node (eNB 160/EPC 110). The controlling node (eNB 160/EPC 110). sends the RRC Connection setup complete and the NAS to the SMAS 330, which sends the RRC Connection setup complete and the NAS to a Telco Carrier Network 250. The Telco Carrier Network 250 sends an authentication request to SMAS 330, which sends the authentication request to controlling node (eNB 160/EPC 110). Controlling node (eNB 160/EPC 110) sends an authentication request to the handset 150, which responds by sending an authentication response to the controlling node (eNB 160/EPC 110).. The controlling node (eNB 160/EPC 110) sends the authentication response to SMAS 330, which sends the authentication response to a Telco Carrier Network 250. Telco Carrier Network 250 sends a Security Mode command to SMAS 30, which sends the Security Mode command to controlling node (eNB 160/EPC 110), which sends the Security Mode command to handset 150. In response handset 150 sends a Security Mode complete to controlling node (eNB 160/EPC 110), which sends the Security Mode complete to SMAS 330, which sends Security Mode complete to the Telco Carrier Network 250 to complete the connection to the Telco.

In a one embodiment of the invention, during the process discussed above, in addition to relaying the transmission/communications between handset 150 and Telco Carrier Network 250, the controlling node (eNB 160/EPC 110) also sets up the communications with the controlling EPC 110 using the 3PGG standards. Once the handset 150 is authenticated the controlling node (eNB 160/EPC 110). takes full control of handset 150. One application is the ability for controlling node (eNB 160/EPC 110) is to monitor the handset.

In a one embodiment of the invention, the Telco 250 remains in communication with SMAS 330, which includes a SDR-UE, which emulates or simulates handset 150, and handset 150 is in communication with controlling node (eNB 160/EPC 110) or rFMAS 310. From the perspective of the Telco and the handset 150 are connected to each other. However, as discussed, in this mode the SMAS 330 has the ability to model the attributes of different types of handsets 150 as seen by the Telco. Thus, SMAS 330, either FMAS 310 or the controlling node (eNB 160/EPC 110), has the ability to change the attributes of handsets 150 communicating with the Telco 250. Some of the attributes and characteristics include communication acquisition time, transmission functions, features, and/or abnormalities, detection of applications (Apps) on the handset, DNS IP destination and App communication packets, Packet Identification, content contained in the data packets, and nuisances between Telcos (Verizon, AT&T) 250 and different types of handsets.

Furthermore, in this configuration, the SMAS 330, through FMAS 310 or the controlling node (eNB 160/EPC 110) may control all the packets, transmissions, being sent to, or received by, either the Telco Network 250 and/or the handset 150.

In accordance with the principles of the invention, this control of transmission by the SMAS 330 allows for a modification of incoming and/or outgoing content (email, SMS, IM content in Apps), information and/or data. This configuration further allows for the redirection of DNS pointer for Apps, DNS IP directs and/or redirects, modification to downloaded Apps, content going to and/or from the Apps, handset software updates and download, handset location (GPS, cell sector, tower location) modifications. This manipulation of the data, content, information, and/or packets may be accomplished in either direction (uplink or downlink).

In addition to handset 150 and Telco 250 Apps and content provider manipulation, the controlling of which Apps are available or not available to the handset, the ability to make and receive or not make and not receive calls, data and messages (IM, SMS) the system has the ability to monitor and manipulate communication parameters, including the logical channel, Transport channel and the Physical channel depending on the goal and objective of the deployment.

In an embodiment of the invention, the Management Access System (FMAS 310 and SMAS 330), the subsystem and/or components of the system may be located in the same location or different locations.

In an embodiment of the invention, the system disclosed, herein, may be set to a channel the handset is programmed to connect to and the SMAS 330, including the SDR-UE, may connect to the same uplink and downlink or it can be programmed to connect to a second uplink and downlink frequency. Since this is designed for all wireless communications, all frequency bands and all protocols may be controllable through this methodology.

In an embodiment of the invention, The EPC (Network core) 110, which can be a Cloud based solution of the Managed Access System, may be placed virtually anywhere.

In an embodiment of the invention, the FMAS 310 and/or SMAS 330 may be configured to be a low noise high gain repeater. For example, where the goal is to allow communication in a secure building, which, however, is designed as a Faraday cage, the system disclosed herein, may incorporate the SMAS 330, including the SDR-UE, outside of the building using any of the 2G, 3G 4G and 5G protocols.

Figure 5:
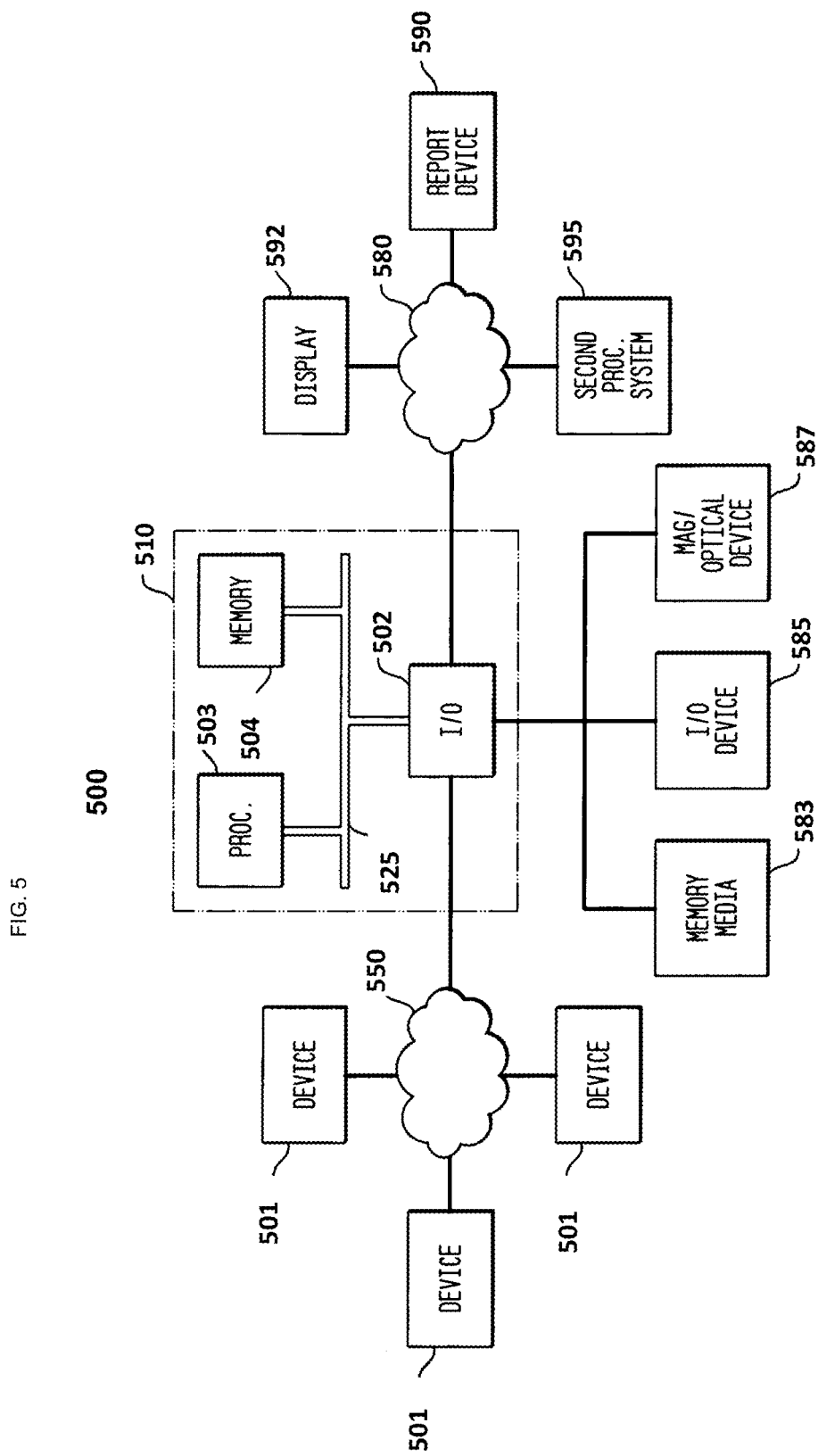
FIG. 5 illustrates a computer system for performing the processing shown herein.

FIG. 5 illustrates a system 500 for implementing the principles of the invention shown herein. In this exemplary system embodiment 500, input data is received from sources 501 over network 550 and is processed in accordance with one or more programs, either software or firmware, executed by processing system 510. The results of processing system 510 may then be transmitted over network 580 for viewing on display 592, reporting device 590 and/or a second processing system 595.

Processing system 510 includes one or more input/output devices 502 that receive data from the illustrated sources or devices 501 over network 550. The received data is then applied to processor 503, which is in communication with Input/output device 502 and memory 504. Input/output devices 502, processor 503 and memory 504 may communicate over a communication medium 525. Communication medium 525 may represent a communication network, e.g., ISA, PCI, PCMCIA bus, one or more internal connections of a circuit, circuit card or other device, as well as portions and combinations of these and other communication media.

Processing system 510 and/or processor 503 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 503 may be a central processing unit (CPU) or a special purposed processing unit or dedicated hardware/software, such as a PAL, ASIC, FGPA, operable to execute computer instruction code or a combination of code and logical operations. In one embodiment, processor 503 may include, or access, code which, when executed by the processor, performs the operations illustrated herein. As would be understood by those skilled in the art when a general purpose computer (e.g., CPU) loaded with or accesses code to implement the processing shown herein, the execution of the code transforms the general purpose computer into a special purpose computer. The code may be contained in memory 504, may be read or downloaded from a memory medium such as a CD-ROM or floppy disk, represented as 583, may be provided by a manual input device 585, such as a keyboard or a keypad entry, or may be read from a magnetic or optical medium 587 or via a second I/O device (not shown) when needed. Information items provided by devices 583, 585, 587 may be accessible to processor 503 through input/output device 502, as shown. Further, the data received by input/output device 502 may be immediately accessible by processor 503 or may be stored in memory 504. Processor 503 may further provide the results of the processing to display 592, recording device 590 or a second processing unit 595.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 510 may also be in two-way communication with each of the sources 501. Processing system 510 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 550 and 580 may also be internal networks or one or more internal connections of a circuit, circuit card or other device, as well as portions and combinations of these and other communication media or an external network, e.g., the Internet and Intranet.

Hence, in accordance with the principles of the invention, a Managed Access System is inserted within the communication path between a handset and a Telco, wherein the managed Access System in receiving handset parametric data operates as, emulates or simulates the handset to the Telco, such that the Telco communicates with the handset through the Managed Access System. The Managed Access System may further include a processor that may determine whether the handset is allowed or not allowed to operate within a designated area. In the case of allowed transmission, the Managed Access system passes data (voice, text, data) between the handset and the Telco. However, in the case the Managed Access System determines the handset is not allowed to operate within the area, the Managed Access System may prevent any connection between the handset and the Telco by inhibiting the transfer of handset data to the Telco. Or may direct the handset to another channel (i.e., a hold channel) which is not used by, or available to, the Telco. Furthermore, the Managed Access System may operate to monitor voice, text or data transmissions direct toward the Telco from the handset or directed toward the handset from the Telco.

In accordance with the principles of the invention, the Managed Access System may include a first Management System, which controls an area from which handsets within the area communicate with the first Management System. The first Management System may transmit the information associated with handsets that communicate with the first Management System to a second Management System. The second Management system may include an adaptable system, which, based on the received parameters of a handset communicating with the first Management System, communicates with a network carrier system (e.g., Verizon, AT&T) to obtain information regarding the handset attempting to communicate with the network carrier. The second Management System may determine whether the handset set is allowed to continue communication with the Telco or prevent communication (denial of service) from communicating with the Telco.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A managed access system comprising:
   a first system comprising;
      a first transceiver configured to:
         create a radio frequency coverage area, wherein the coverage area represents an area in which wireless communication is restricted;
         detect signal transmission from a wireless communication device; and
      a first processor configured to:
         receive information regarding said detected signals transmitted by the wireless communication device;
         transmit information regarding the detected signal received from the wireless communication device;
   a second system comprising:
      a second processor configured to:
         receive said information regarding the detected signal received from the wireless communication device;
         adapt a second transceiver to operate based on characteristics associated with said detected signal received from the wireless communication device;
         communicate, through the adapted second transceiver, identification information associated with said detected signal to a service provider, said service provider representing an authentication source;
         receive authentication information, through the adapted second transceiver from the service provider,
         retain said authentication information, and
         transmit said authentication information, to the first system.

2. The managed access system of claim 1, wherein said first transceiver is configured to:

generate a signal having a signal power within said coverage area greater than a signal power of said service provider within said coverage area.

3. The managed access system of claim 1, wherein said second transceiver is configured to:
receive a transmission from the service provider, and
transmit said transmission from said service provider to said first system, wherein said transmission comprises said authentication information.

4. The managed access system of claim 1, wherein said first transceiver or first system is configured to:
detect subsequent transmissions from said wireless communication device, and
transmit at least said detected transmission to said second system, wherein said second system transmits at least said detected transmission to said service provider.

5. The managed access system of claim 1, wherein said first system controls said wireless communication device.

6. The managed access system of claim 1, wherein said second system is registered with the service provider.

7. The managed access system of claim 1, wherein said wireless communication device is one of: a second generation (2G) wireless communication device, a third generation (3G) wireless communication device, a fourth generation (4G) wireless communication device, a fifth generation (5G) wireless communication device and an access point device.

8. The managed access system of claim 1, wherein said second system is configured to:
operate as said wireless communication device, wherein said second transceiver performs one of: emulates characteristics of said wireless communication device and simulates characteristics of said wireless communication device.

9. The managed access system of claim 1, wherein said first system operates as one of: an eNB/EPC, a local network, a controlling node, a service provider, an LTE stack, an eNodeB, and a femto cell.

10. The managed access system of claim 1, wherein said first transceiver said wireless communication device, said service provider and said second transceiver may operate on one of: a same frequency channel and on different frequency channels.

11. The managed access system of claim 1, wherein said first transceiver and said second transceiver operate on one of: a same uplink frequency, a same downlink frequency, a different uplink frequency and a different downlink frequency.

12. The managed access system of claim 1, wherein said first transceiver and said second transceiver operate on all frequency bands and all protocols of a wireless communication protocol.

13. The managed access system of claim 1, further comprising wherein said first transceiver and said second transceiver are one of: co-located and remotely located.

14. The managed access system of claim 1, wherein at least one of said first transceiver and said second transceiver allow for at least one of: a redirection of a DNS pointer for Apps, a DNS IP for directing and redirecting downloaded Apps, modification to downloaded Apps, content directed to Apps, content received from Apps, download software updates, wireless communication location, wherein said wireless communication location is based on at least one of: a GPS location, a location of a cell sector and a location of a tower.

15. The managed access system of claim 1, wherein at least one of said first transceiver and said second transceiver operates to perform at least one of: manipulate at least one of: an attribute of said wireless communication device, a data received, at least one of: an incoming and an outgoing content, an email, a small message service (SMS), an IM content, an information, an App, data and packets, information, and packets in one of: an uplink direction and a downlink direction.

16. The managed access system of claim 15, wherein said attribute is one of: a communication acquisition time of said wireless communication device, a transmission function of said wireless communication device, a feature of said wireless communication device, an abnormality of said wireless communication, device a detection of applications (Apps) on said wireless communication device, a DNS IP destination and App communication packets associated with said wireless communication device, a packet Identification, a content contained in a data packet, and nuisances between said service providers and different types of wireless communication devices.

17. The managed access system of claim 1, wherein each of said first transceiver and said second transceiver comprises:
at least one antenna,
at least one receiver,
at least one transmitter,
at least one decoder,
a plurality of filters,
a plurality of amplifiers, and at least one processor.

18. The managed access system of claim 1, wherein at least one of said first system and said second system is configured to:
perform at least one of: model attributes of different types of wireless communication devices and change attributes of different types of wireless communication devices as seen by the service provider.

19. The managed access system of claim 1, wherein at least one of said first system and said second system is configured to:
perform at least one of:
allow communications on at least one of: an uplink frequency and a downlink frequency, and
deny communications on at least one of: an uplink frequency and a downlink frequency.

20. The managed access system of claim 1, wherein at least one of said first system and said second system is configured to:
perform at least one of: model attributes of different types of service providers and change attributes of different types of service providers as seen by said wireless communication device.

21. The managed access system of claim 1, wherein at least one of said second transceiver and said second system is a Software Defined Radio User Equipment (SD UE).

22. The managed access system of claim 1, wherein said first system is configured to:
determine a location of said wireless communication device; and
transmit said determined location of said wireless communication device to said second system.

23. The managed access system of claim 22, wherein said second system is configured to:
receive said location information;
determine whether said location information indicates said wireless communication device is within said coverage area;
determine an allowability of said wireless communication device within said coverage area; and inhibit communication with said service provider when said allowability is determined as unallowed.

24. The managed access system of claim 1, said wireless communication device is one of: a handset, a PDA, a digital handset, a user equipment (UE) and a cell phone.

25. The managed access system of claim 1, wherein at least one of: said second transceiver and said second system is configured to:
 perform at least one of: manipulate data content to or from said wireless communication device, manipulate data content to or from said service provider, monitor data of said wireless communication device, control one of: content of said wireless communication device, software updates of said communication device, downloads to said wireless communication device, determine a location of said wireless communication device, wherein said location information is one of: GPS obtained information, a cell sector defined location and a tower location and control distribution of packets in at least one of: an uplink direction from said wireless communication device and a downlink direction to of said wireless communication device.

26. The managed access system of claim 1, wherein at least one of said first transceiver and said second transceiver is configured to operate as one of: an eNodeB, a femto cell, a transceiver system, an eNB/EPC, a local network, a server provider, a LTE stack and a controlling node.

27. The managed access system of claim 1, wherein said first transceiver is configured to:
 transmit said transmission from said first system to said wireless communication device.

28. The managed access system of claim 1, wherein said second system or second transceiver is configured to:
 detect subsequent transmissions from said service provider, and
 transmit at least said detected transmission to said first system, wherein said first system transmits at least said detected transmission to said wireless communication device.

29. The managed access system of claim 1, wherein said second system operates as one of: said wireless device and a simulated wireless device.

30. The managed access system of claim 1, wherein said first transceiver, said wireless communication device, said service provider and said second transceiver may operate on one of: a same protocol and on different protocols.

\* \* \* \* \*

UNITED STATES PATENT AND TRADEMARK OFFICE
CERTIFICATE OF CORRECTION

PATENT NO. : 10,708,782 B1
APPLICATION NO. : 16/241776
DATED : July 7, 2020
INVENTOR(S) : Joseph S. Noonan Page 1 of 1

It is certified that error appears in the above-identified patent and that said Letters Patent is hereby corrected as shown below:

In the Claims

Column 11, Line 39 Claim 10: delete "transceiver said" insert therefor -- transceiver and said --.

Column 11, Line 52-53 Claim 13: delete "further comprising".

Column 14, Line 17 Claim 29: delete "wireless device" insert therefor -- wireless communication device --.

Signed and Sealed this
Fifteenth Day of September, 2020

Andrei Iancu
*Director of the United States Patent and Trademark Office*